(12) United States Patent
Kimura et al.

(10) Patent No.: US 6,863,293 B2
(45) Date of Patent: Mar. 8, 2005

(54) WHEELCHAIR

(76) Inventors: Noritaka Kimura, 14-26, Nokata 1-chome, Nishi-ku, Fukuoka-shi, Fukuoka 819-0043 (JP); Takayuki Hirata, 2-12-206, Nishinooka 2-chome, Nishi-ku, Fukuoka-shi, Fukuoka 819-0000 (JP); Yoshiharu Yoshinaga, 781-1, Shimamachi Kishi, Itoshima-gun, Fukuoka 819-1334 (JP); Norihide Kimura, 47-50, Shiratodai 6-chome, Fuchu-shi, Tokyo 183-0011 (JP); Kazushi Aizawa, 17, Idaminamimachi 7-chome, Okazaki-shi, Aichi 444-0068 (JP); Masahiro Hachisuka, 1, Nishiachiwacho Goyoden 1-chome, Okazaki-shi, Aichi 444-2111 (JP)

( * ) Notice: Subject to any disclaimer, the term of this patent is extended or adjusted under 35 U.S.C. 154(b) by 0 days.

(21) Appl. No.: 10/688,248

(22) Filed: Oct. 16, 2003

(65) Prior Publication Data

US 2004/0080138 A1 Apr. 29, 2004

(30) Foreign Application Priority Data

Oct. 22, 2002 (JP) .................................. 2002-306539
May 26, 2003 (JP) .................................. 2003-147282

(51) Int. Cl.⁷ ................................................. B60T 1/14
(52) U.S. Cl. ............................. 280/304.1; 280/250.1; 188/2 F
(58) Field of Search .................... 188/5, 2 F; 280/250.1, 280/304.1

(56) References Cited

U.S. PATENT DOCUMENTS

| | | | | |
|---|---|---|---|---|
| 4,623,043 A | * | 11/1986 | Babilas ........................ | 188/2 F |
| 5,203,433 A | * | 4/1993 | Dugas ........................ | 188/2 F |
| 5,894,912 A | * | 4/1999 | Dobben ........................ | 188/2 F |
| 5,984,334 A | * | 11/1999 | Dugas ........................ | 280/250.1 |
| 6,352,138 B1 | * | 3/2002 | Duran et al. .................. | 188/2 F |
| 6,371,503 B2 | * | 4/2002 | Ritchie et al. ............... | 280/304.1 |
| 6,688,437 B2 | * | 2/2004 | Usherovich .................. | 188/2 F |
| 6,739,610 B2 | * | 5/2004 | Connors et al. .............. | 280/304.1 |
| 2003/0146056 A1 | * | 8/2003 | Wren .......................... | 188/2 F |

FOREIGN PATENT DOCUMENTS

| | | |
|---|---|---|
| JP | 51-115337 | 9/1976 |
| JP | 52-29043 | 3/1977 |
| JP | 60-32920 | 3/1985 |
| JP | 3000205 | 5/1994 |

OTHER PUBLICATIONS

Kubo Kazuo, "Wheelchair and Automatic Brake Device for Wheelchair," Apr. 7, 1998, Patent Abstracts of Japan.
Masashi et al., "Wheelchair," Oct. 8, 2002, Patent Abstracts of Japan.
Dedokoro Toshimi, "Wheelchair for Physically Handicapped Person," Oct. 30, 2001, Patent Abstracts of Japan.

* cited by examiner

*Primary Examiner*—Avraham Lerner
(74) *Attorney, Agent, or Firm*—Beyer Weaver & Thomas, LLP

(57) ABSTRACT

A wheelchair has actuation plates provided in juxtaposition with the seat to descend when a user sits on the seat to lower the seat with the user's weight and to ascend when the user rises from the seat to permit the seat to return with removal of the weight. A brake is mounted on the axle shafts to brake the axle shafts and energized constantly in a non-braking direction. Levers are coupled directly or indirectly to the brake to move according to descending motions of the actuation plates to put the brake in a non-braking state and to move according to ascending motions of the actuation plates to put the brake in a braking state. Biasing devices for evacuating legs that extend from the seat and/or steps that are mounted onto the legs.

18 Claims, 10 Drawing Sheets

WHEELCHAIR

BACKGROUND OF THE INVENTION

The present invention relates to a wheelchair.

DESCRIPTION OF THE RELATED ART

With conventional wheelchairs, there is a need of manually braking a wheelchair when a user goes away from the wheelchair. Therefore, in the case where a user goes away from a wheelchair failing to apply braking, there is a possibility that the wheelchair begins to move the moment the user puts a hand or hands on the wheelchair trying to move the user's body weight to the wheelchair again.

Conventionally, the following wheelchair is known as solving such problem. The wheelchair comprises a metallic sheet stopper, which is cut to afford meshing with a spoke of a rear wheel. A detector is mounted below a central portion of a seat to actuate the stopper. When a user rises from the wheelchair, the seat having sunk due to weight ascends and the detector detects such ascent. Based on the detecting action, the cut in the stopper meshes with the spoke of the rear wheel and the rear wheel is made stationary to apply braking. Also, when the user sits and the user's body weight is applied on the seat to lower the seat, a signal from the detector causes the stopper to separate from the spoke of the rear wheel to release braking.

With the wheelchair with an automatic brake according to the prior art, however, when a user rises from the wheelchair and the stopper is not positioned in opposition to a spoke, rear wheels will rotate until a next spoke comes to a position of the stopper. That is, "idle time" is generated in the meantime and the wheelchair freely runs to become unstable. Also, since the stopper meshes with a spoke of the rear wheels to apply braking, large forces concentrate on a spoke made of a thin metallic bar. Therefore, there is involved a problem that spokes are liable to break in repeated use.

Also, steps are mounted on all wheelchairs and get in the way forwardly of a course to obstruct beginning of walking when a user gets off a wheelchair to begin walking, so that it is necessary to remove steps to positions not to obstruct a user's course before the user begins walking. With conventional wheelchairs, a user must bend forward exceedingly to spring up the steps with hands, or with feet.

In addition, although not related to the gist of the invention, for example, JP-A-5-103815 and JP-A-7-232646 are enumerated to disclose a brake device for wheelchairs.

SUMMARY OF THE INVENTION

It is an object of the invention to provide a wheelchair with an automatic brake, in which braking is applied the moment a user rises, and which is excellent in safety.

To achieve the above object, the present invention provides a wheelchair. The wheelchair includes a seat, a pair of rear wheels fixed to axle shafts arranged below the seat and arranged outside both sides of the seat, a grasping portion arranged rearwardly of the seat to be grasped and operated by a helper, at least one front wheel arranged forwardly of the axle shafts. Actuation plates provided in juxtaposition with the seat to descend when a user sits on the seat to lower the seat with the weight and to ascend when the user rises from the seat to permit the seat to return with removal of the weight. Brake means mounted on the axle shafts to brake the axle shafts and energized constantly in a non-braking direction. Levers coupled directly or indirectly to the brake means to move according to descending motions of the actuation plates to act on the brake means to put the brake means in a non-braking state and to move according to ascending motions of the actuation plates to act on the brake means to put the brake means in a braking state. The user sits on the seat, the user's body weight causes the seat to descend and the actuation plates to move downward and positional movements of the actuation plates cause the levers to move to release braking on the axle shafts by the brake means, and when the user having sat on the seat rises, the actuation plates having been pushed down by the user's body weight move upward and positional movements of the actuation plates cause the levers to move to permit the brake means to brake the axle shafts.

A further aspect of the present invention is a wheelchair including a seat, a pair of rear wheels fixed to axle shafts arranged below the seat and arranged outside both sides of the seat, a grasping portion arranged rearwardly of the seat to be grasped and operated by a helper, at least one front wheel arranged forwardly of the axle shafts, legs extended forward and downward from the seat, steps mounted on the legs. Actuation plates provided in juxtaposition with the seat to descend when a user sits on the seat to lower the seat with the weight and to ascend when the user rises from the seat to permit the seat to return with removal of the weight. Brake means mounted on the axle shafts to brake the axle shafts and energized constantly in a non-braking direction. Levers coupled directly or indirectly to the brake means to move according to descending motions of the actuation plates to act on the brake means to put the brake means in a non-braking state and to move according to ascending motions of the actuation plates to act on the brake means to put the brake means in a braking state. The legs being turnably supported horizontally in base positions and biased in one directions of turning by second bias means. Position holding means for holding the legs in positions. The steps are used, against the bias of the second bias means and released from a holding state as the actuation plates move upward, and wherein when the user sits on the seat, the user's body weight causes the seat to descend and the actuation plates to move downward and positional movements of the actuation plates cause the levers to move to release braking on the axle shafts by the brake means, and when the user having sat on the seat rises, the actuation plates having been pushed down by the user's body weight move upward and positional movements of the actuation plates cause the levers to move to permit the brake means to brake the axle shafts and the holding state by the position holding means is released to cause the bias of the second bias means to evacuate the legs.

A further aspect of the present invention is a wheelchair including a seat, a pair of rear wheels fixed to axle shafts arranged below the seat and arranged outside both sides of the seat, a grasping portion arranged rearwardly of the seat to be grasped and operated by a helper, at least one front wheel arranged forwardly of the axle shafts, legs extended forward and downward from the seat, steps mounted on the legs. Actuation plates provided in juxtaposition with the seat to descend when a user sits on the seat to lower the seat with the weight and to ascend when the user rises from the seat to permit the seat to return with removal of the weight. Brake means mounted on the axle shafts to brake the axle shafts and energized constantly in a non-braking direction. Levers coupled directly or indirectly to the brake means to move according to descending motions of the actuation plates to act on the brake means to put the brake means in a non-braking state and to move according to ascending motions of the actuation plates to act on the brake means to put the brake means in a braking state, the steps being turnably supported in base positions and biased in one directions of turning by third bias means. Position holding means for holding the steps in positions. The steps are used, against the bias of the third bias means and released from a holding state as the actuation plates move upward, and wherein when the user sits on the seat, the user's body weight causes the seat to descend and the actuation plates to move downward against the first bias means and positional movements of the actuation plates cause the levers to move to release braking on the axle shafts by the brake means, and when the user having sat on the seat rises, the actuation plates having been pushed down by the user's body weight move upward by the first bias means and positional movements of the actuation plates cause the levers to move to permit the brake means to brake the axle shafts and the holding state by the position holding means is released to cause the bias of the third bias means to evacuate the steps.

Other aspects and advantages of the present invention will become apparent from the following description, taken in conjunction with the accompanying drawings, illustrating by way of example the principles of the invention.

DESCRIPTION OF THE PREFERRED EMBODIMENTS

First Embodiment

A first embodiment of the invention will be described with reference to FIGS. 1 to 10. The embodiment comprises the following four mechanisms. The first one is a brake mechanism used in the case where a user rises from a wheelchair and in the case where a user rides on the wheelchair, the second one is a brake actuating mechanism for a helper, the third one is a brake release mechanism during conveying an empty wheelchair, and the fourth one is an automatic opening mechanism for steps.

Figure 1:
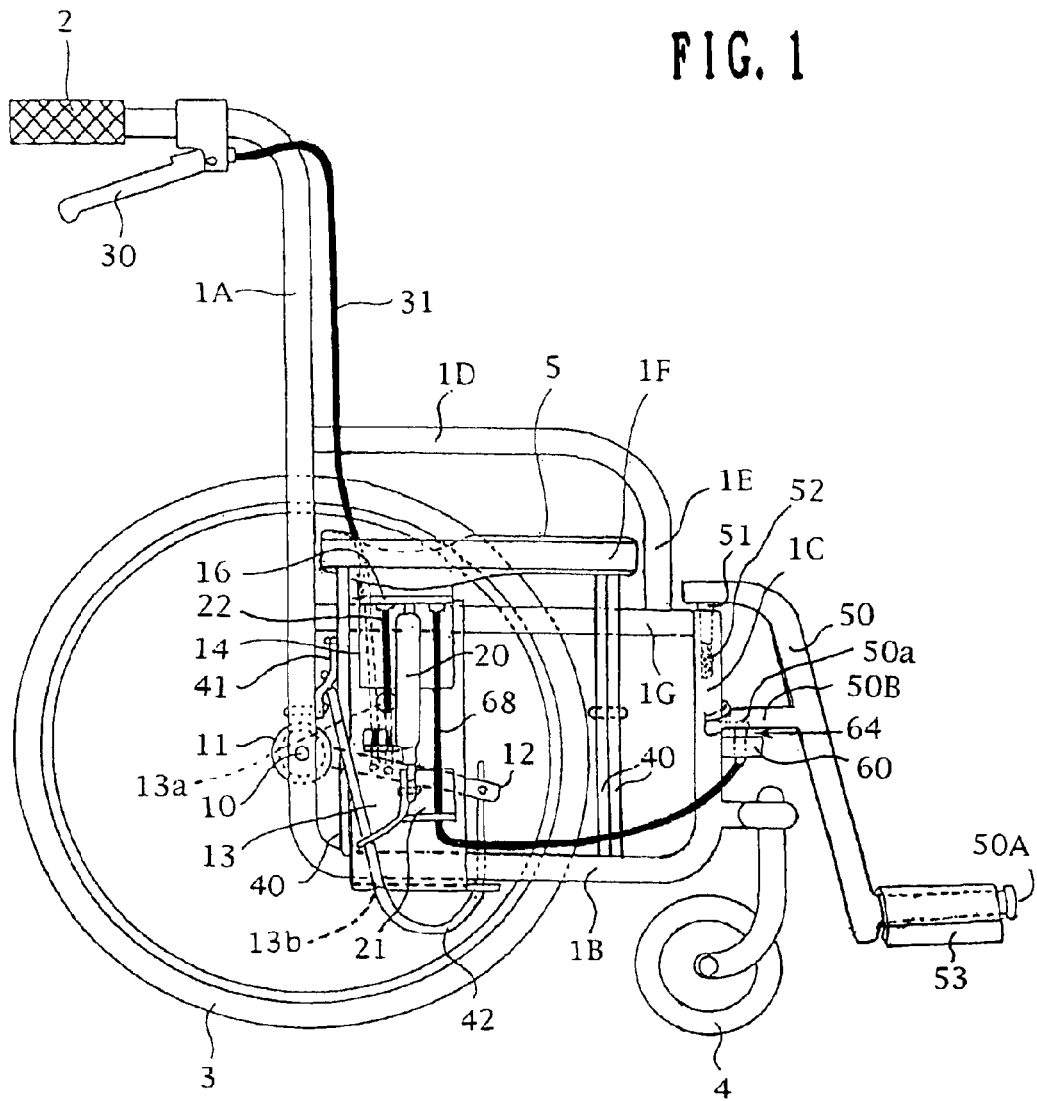
FIG. 1 is a side view showing an embodiment of a wheelchair with an automatic brake according to the invention when a left side of a wheelchair body in a state, in which a user sits on a seat, is viewed from inside.

First, an explanation will be given to a constitution of the brake mechanism. As shown in FIG. 1, a frame of the wheelchair comprises main rear columns 1A composed of a pair of left and right pipes extending vertically, a pair of left and right, main lower columns 1B extending forward from lower ends of the main rear columns 1A, a pair of left and right, first main front columns 1C extending upward from forward ends of the main lower columns 1B, a pair of left and right, main upper and horizontal columns 1D fixed to intermediate portions of the main rear columns 1A and extending forward therefrom, a pair of left and right, second main front columns 1E extending downward from forward ends of the main upper and horizontal columns 1D, a pair of left and right, first mount pipes 1F, both ends of which are interposed between the main rear columns 1A and the second main front columns 1E and fixed to upper ends of front and rear, cross braces 40, and a pair of left and right, second mount pipes 1G, which are arranged below and in parallel to the first mount pipes 1F, and one ends of which are fixed to the main rear columns 1A and the other ends of which are fixed to the first and second main front columns 1C, 1E.

The front and rear, cross braces 40 are fixed at upper ends thereof to front or rear portions of the first mount pipes 1F and at lower ends thereof to front or rear portions of the main lower columns 1B on an opposite side, and intersect each other at central portions thereof to be turnably fixed to each other at the intersections, thus enabling folding of the wheelchair.

Upper ends of the main rear columns 1A make rearwardly bent handles 2 held by a helper. A pair of left and right, rear wheels 3 are rotatably mounted to the main rear columns 1A, and a pair of left and right, front wheels 4 are rotatably mounted to lower portions of the first main front columns 1C. Mounted to the pair of left and right, first mount pipes 1F is a seat 5 having elasticity and capable of moving downward with an underside thereof bending. In addition, depiction of spokes of the rear wheels 3 and the front wheels 4 is omitted in FIGS. 1 and 3.

Figure 2:
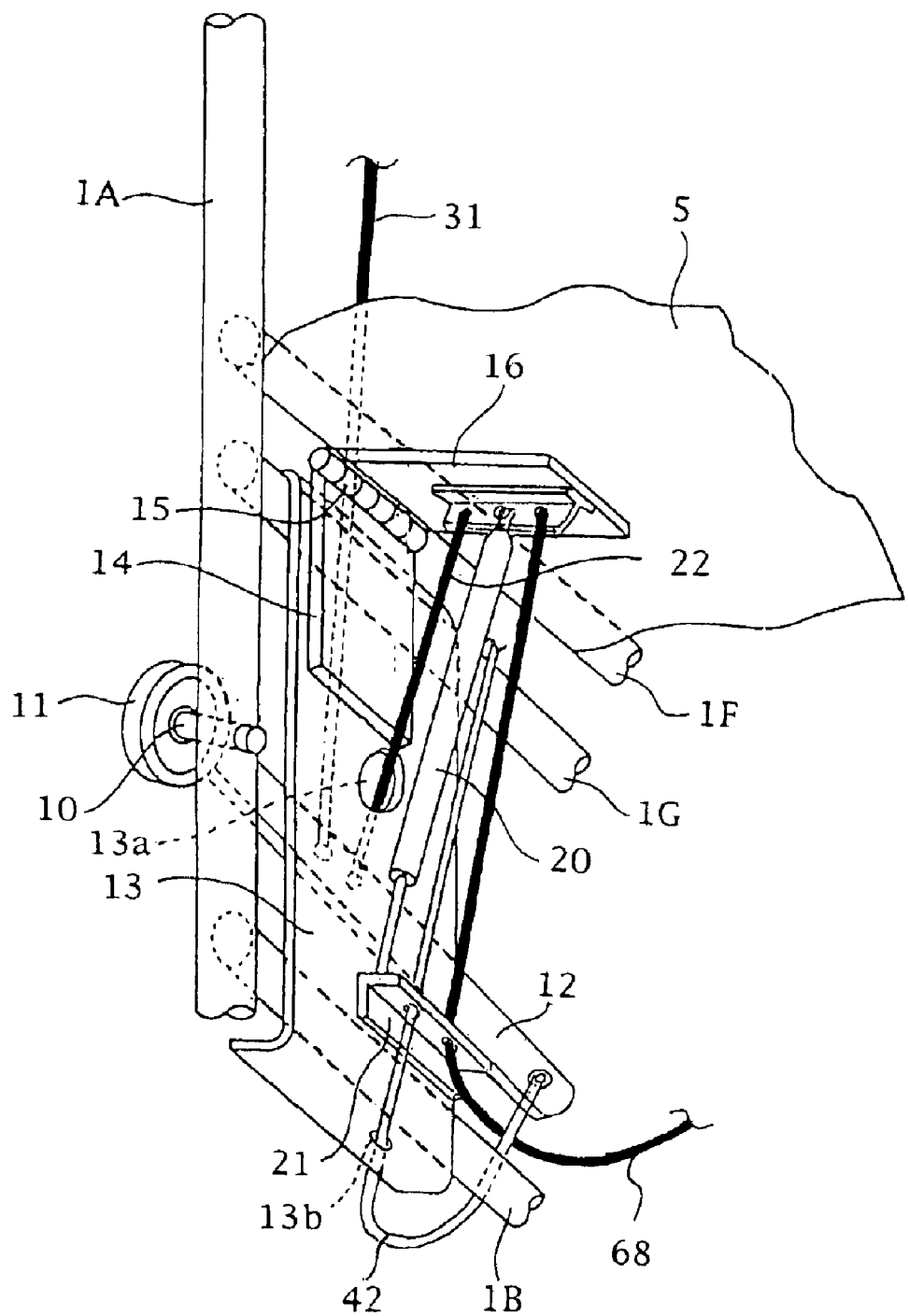
FIG. 2 is a perspective view showing an essential part of FIG. 1 as viewed from obliquely downward and inside of a rear side.

As shown in FIGS. 1 and 2, mounted on left and right axle shafts 10 of the rear wheels 3 are axle-shaft clamping type brake means 11. Fixed to brake actuating portions of the brake means 11 are ends of brake levers 12. Used as the brake means 11 are, for example, "SERVO BRAKES", "BAND BRAKES" (both being JIS. NO. 6415) manufactured by Karasawa Seisakusho Kabushiki-kaisha, which are used for axle shaft brakes for bicycles, and so on.

Fixed to the pair of left and right, second mount pipes 1G are upper ends of first mount plates 13 each extending below the brake levers 12 and toward the main rear columns 1A.

Lower end of the first mount plates 13, respectively, are fixed to the pair of left and right, main lower columns 1B. Fixed to upper portions of the pair of left and right, first mount plates 13, respectively, are second mount plates 14, to which one ends of actuation plates 16 are mounted through hinges 15 to be able to swing vertically. Here, the actuation plates 16 are arranged in a manner to contact with an underside of a portion amounting to about ¼ of a rear portion of the seat 5.

Upper ends of dampers 20 composed of a gas damper, an air damper, an oil damper, or the like to serve as first bias means are pivotally mounted to the actuation plates 16, and lower ends of the dampers 20 are pivotally mounted to support plates 21 fixed to lower portions of the first mount plates 13. Extension forces of the dampers 20 push up the actuation plates 16 to bring the same into contact with the underside of the seat 5. Lower ends of lengths of wire 22 for actuation of braking are fixed to the brake levers 12, and upper ends of the lengths of wire 22 are mounted to the actuation plates 16 through small windows 13a provided on the first mount plates 13.

Figure 3:
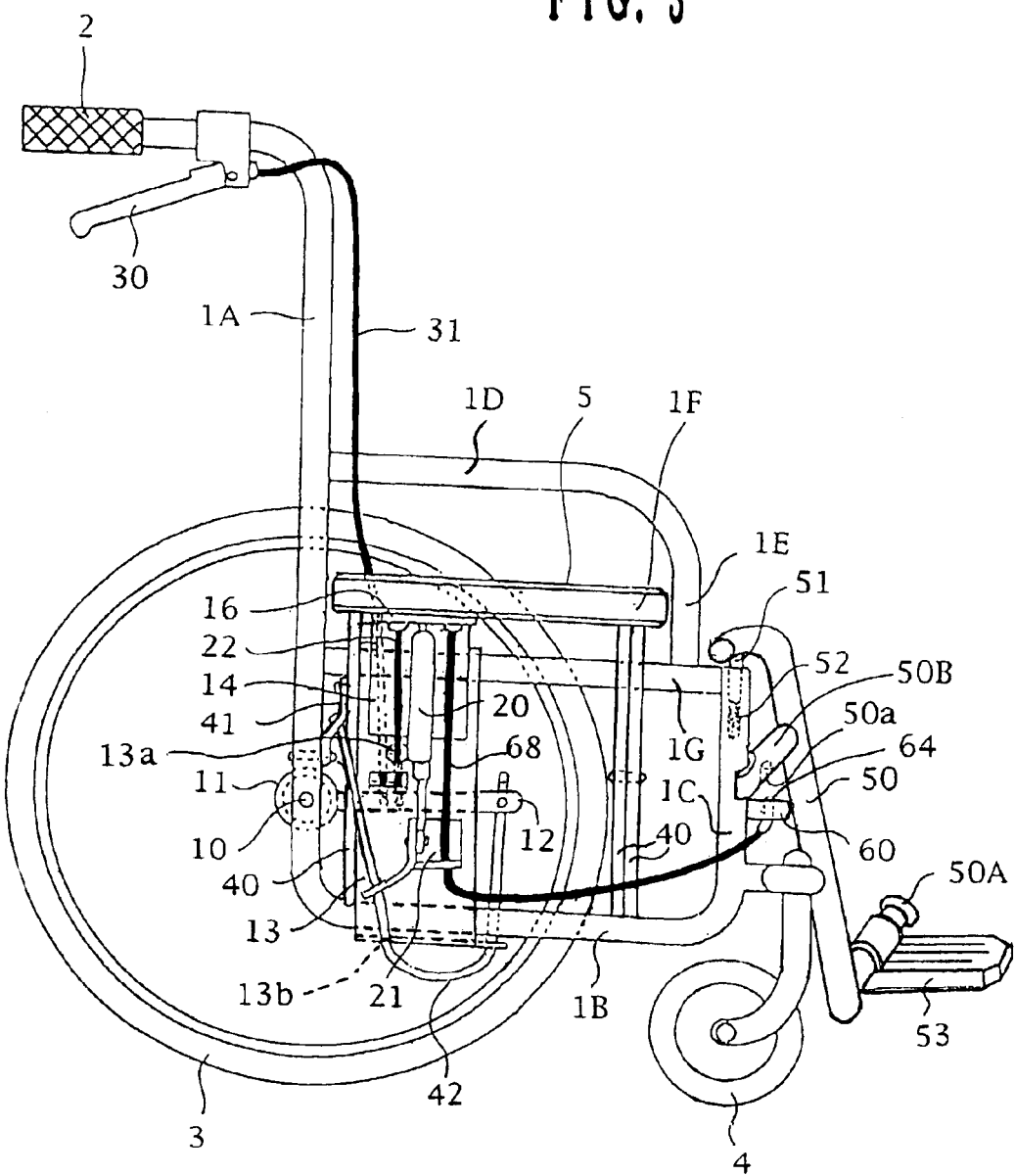
FIG. 3 is a side view showing an embodiment of a wheelchair with an automatic brake according to the invention when a left side of a wheelchair body in a state, in which a user goes away from a seat, is viewed from inside.
Figure 4:
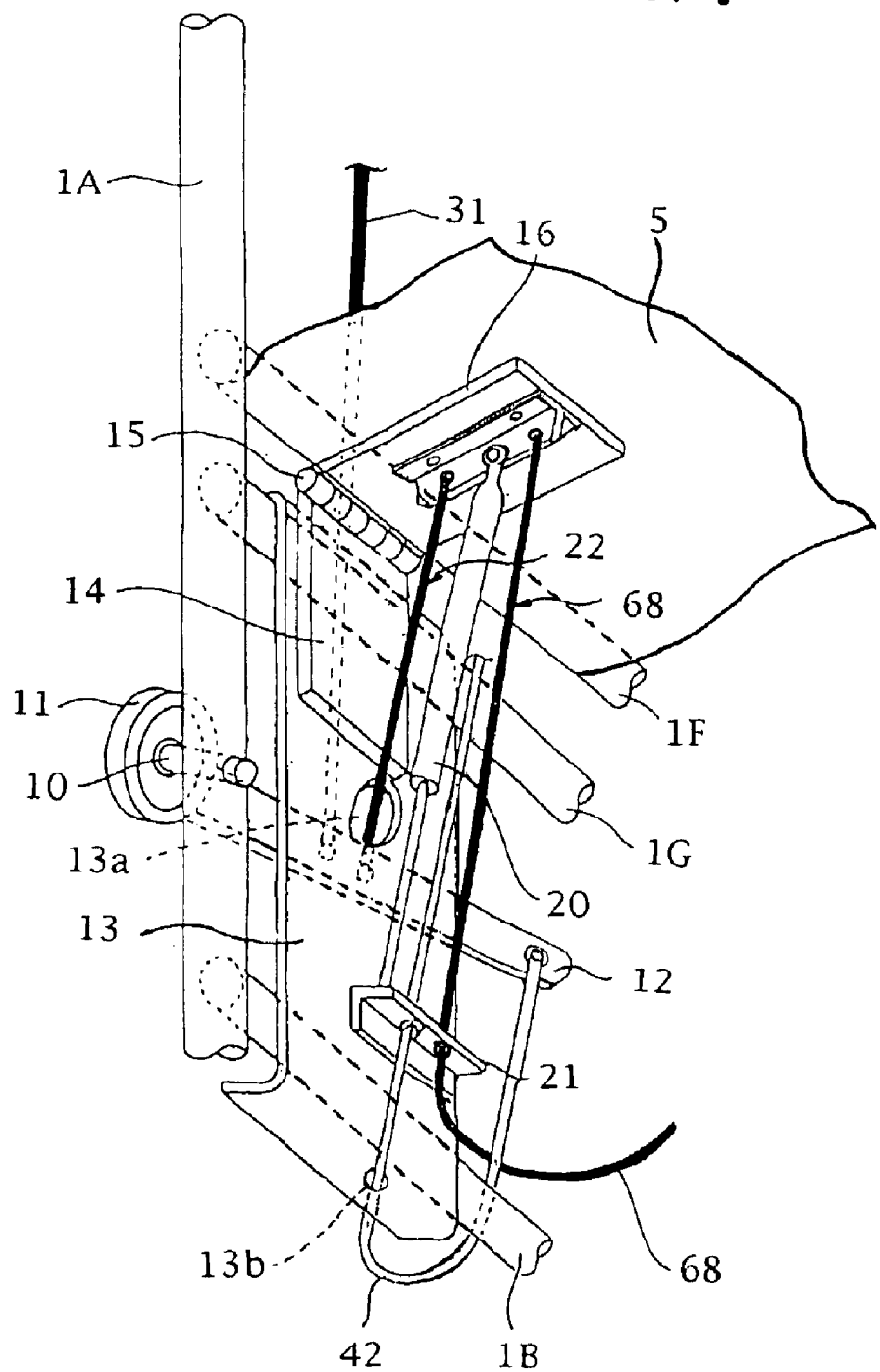
FIG. 4 is a perspective view showing an essential part of FIG. 3 as viewed from obliquely downward and inside of a rear side.

As shown in FIGS. 1 and 2, the lengths of wire 22 loosen in a state, in which the dampers 20 are not extended and the actuation plates 16 swing downward, that is, a user of the wheelchair sits on the seat 5, and the brake levers 12 swing downward owing to restoring forces of bias means housed in the brake means 11, so that braking of the axle shafts 10 is released. As shown in FIGS. 3 and 4, in a state, in which the dampers 20 are extended and the actuation plates 16 swing upward, that is, a user of the wheelchair rises from the wheelchair, the lengths of wire 22 are pulled upward and the brake levers 12 are pulled upward, so that the axle shafts 10 are braked against restoring forces of bias means housed in the brake means 11.

Subsequently, an explanation will be given to an action of the brake mechanism. FIGS. 1 and 2 show a state, in which a user of the wheelchair sits on the seat 5 and body weight is applied on a corresponding portion of the seat 5 to the actuation plates 16, so that the seat 5 is pushed down at the corresponding portion to push down the actuation plates 16 against extension forces of the dampers 20. Also, the actuation plates 16 are pushed down whereby the lengths of wire 22 with upper ends thereof fixed to the actuation plates 16 loosen and the upward pulling forces of the lengths of wire 22 acting on the brake levers 12 disappear, so that biasing forces of bias means housed in the brake means 11 are restored to swing the brake levers 12 downward and braking of the axle shafts 10 is released (put in a non-braked state).

In contrast, when a user rises from a state, in which the user sits on the seat 5, that is, a state shown in FIGS. 1 and 2, weight produced by body weight applied on the seat 5 disappears, so that pressure on the dampers 20 is released and so the dampers 20 are extended to push up the actuation plates 16 as shown in FIGS. 3 and 4. When the lengths of wire 22 with upper ends thereof fixed to the actuation plates 16 are thereby pulled upward, the brake levers 12, to which lower ends of lengths of wire 22 are joined, are pulled up whereby restoring forces of the bias means housed in the brake means 11 to release braking are applied on the brake levers 12 and so the axle shafts 10 are braked (put in a braked state).

In this manner, since braking is applied the moment a user rises, and there is no play, the wheelchair remains stable and safe. Also, since the axle-shaft clamping type brake means 11, of which durability and safety are warranted on the basis of results of use in many years, are adopted to clamp and brake the axle shafts 10, they are excellent in durability and safety.

Incidentally, there is in many cases the possibility that when a user by one self rides on a wheelchair, the user first puts a hand or hands on the seat 5 trying to support a body, and so risk of fall is highly possible since the user's posture is not stable in the case where forces produced when the user puts a hand or hands on the seat 5 release braking to permit the wheelchair to move. Accordingly, in order to avoid such risk, the actuation plates 16 in the first embodiment are arranged in a manner to contact with an underside of a portion amounting to about ¼ of a rear portion of the seat 5. More specifically, body weight of the user is applied on that portion amounting to about ¼ of the rear portion of the seat 5, which is disposed at the back of the seat to be adequately distant from that portion, on which the user possibly puts a hand or hands, and braking is released after the user's posture becomes adequately stable, which warrants safety.

In addition, while the first embodiment uses the dampers 20 as tension applying means for pushing up the actuation plates 16, springs or the like may be used to bias the actuation plates 16. Also, while the actuation plates 16 are pivotally on the first mount plates 13, they may be provided on the first mount plates 13 to be vertically movable.

Subsequently, an explanation will be given to the brake actuating mechanism. As shown in FIGS. 1 and 3, handle levers 30, respectively, are mounted on the pair of left and right handles 2. Lengths of brake wire 31 are coupled at upper ends thereof to the handle levers 30, and at lower ends thereof to the brake levers 12 as shown in FIGS. 1 to 5. Hereupon, in the case where there is a need of braking when a user rides on the wheelchair and a helper pushes the wheelchair, the lengths of brake wire 31 are pulled upward upon grasping of the handle levers 30 and so the brake levers 12 coupled to the lengths of brake wire 31 are pulled up to apply braking.

In addition, although not shown, it goes without saying that when there is a need of braking by a user who sits on the wheelchair, a conventional manual brake mounted on the wheelchair is used as it is.

Figure 5:
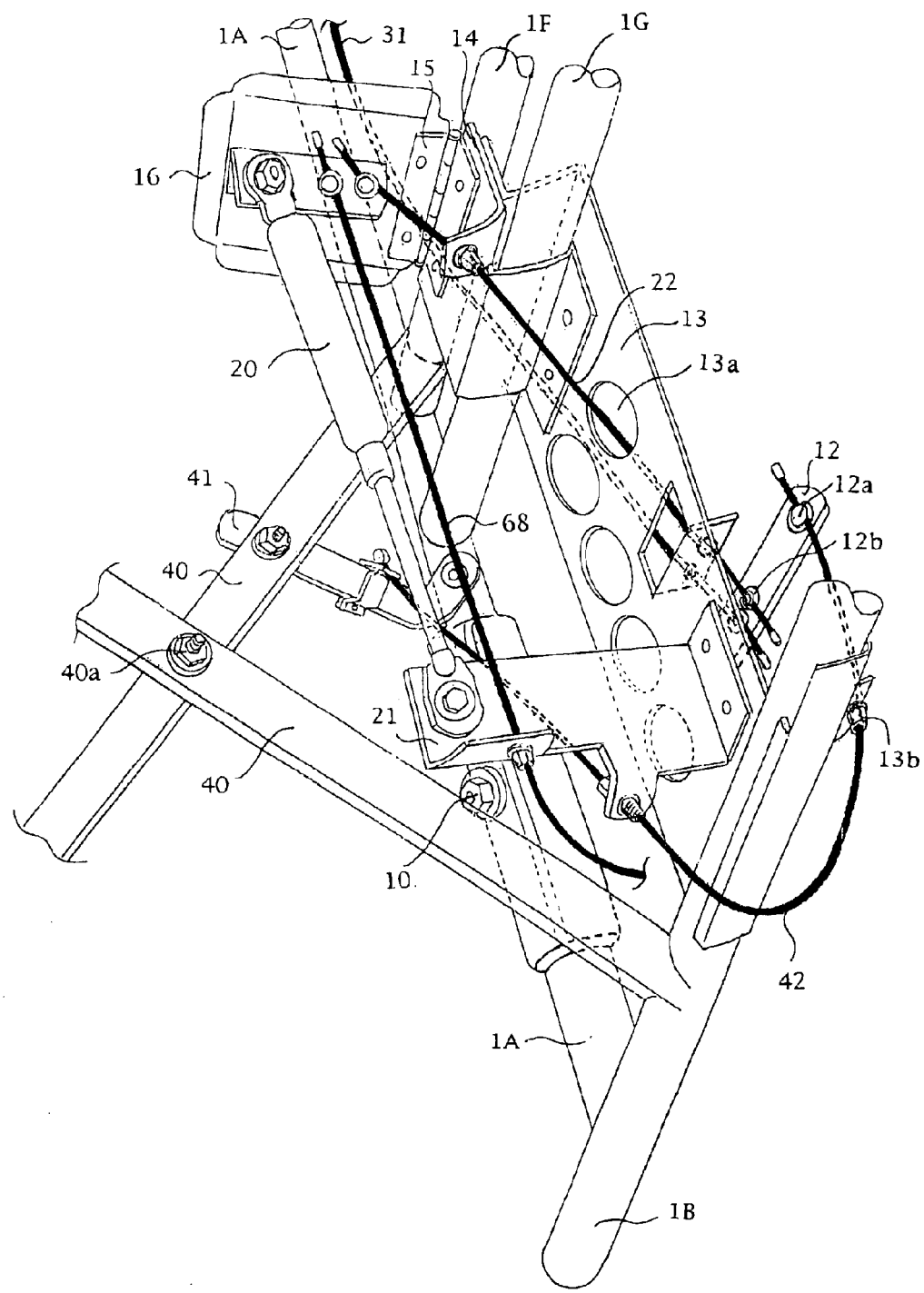
FIG. 5 is a perspective view showing an essential part of FIG. 3 as viewed from forwardly downward and inside.

Subsequently, an explanation will be given to a constitution of the brake release mechanism when an empty wheelchair is to be conveyed. As described, when a user goes away from the wheelchair to make the same empty, braking is automatically applied to come to a state shown in FIG. 4. Accordingly, there is a need of releasing braking when an empty wheelchair is to be conveyed. As shown in FIG. 5, both ends of a release lever 41 are pivotally mounted to a portion substantially intermediate between an intersection 40a of the rear cross braces 40 among the two pairs of front and rear cross braces 40, which connect between the first mount pipes 1F and the main lower columns 1B on a side opposed to the first mount pipes 1F, and upper ends of the cross braces 40 and to the main rear column 1A disposed on the same side as that of the portion.

An upper end of a length of release wire 42 is fixed to the release lever 41 and a lower end of the length of release wire 42 is fixed to the brake lever 12 from below through wire through of the support plate 21 and holes 13b formed on bent portion the first mount plate 13. A location 12a, in which the length of release wire 42 is fixed to the brake lever 12, is positioned much distant from a pivot of the brake lever 12 relative to a location 12b, in which the lengths of brake actuating wire 22 are fixed to the brake lever 12, such that a larger force than brake actuating forces with the wheelchair being empty acts on the brake lever 12 in a release direction as shown in FIG. 5.

Subsequently, an explanation will be given to an action of the brake release mechanism when an empty wheelchair is to be conveyed. Generally, wheelchairs can be folded by causing a pair of left and right, rear wheels 3 and a pair of left and right, front wheels 4 to approach in an overlapping manner. More specifically, by lifting a longitudinal center line of the seat 5 in a manner to make the center line upwardly convex when an empty wheelchair is to be conveyed, it is possible to cause the pair of left and right, first mount pipes 1F, to which both left and right, outer edges of the seat 5 are fixed, to approach each other. Hereupon, when the pair of left and right, first mount pipes 1F are caused to approach each other in a manner described above, the pair of left and right, second mount pipes 1G, the pair of left and right, main lower columns 1B, the pair of left and right, rear wheels 3, and the pair of left and right, front wheels 4 are caused interlocking therewith to approach each other, and further the front cross braces 40 and the rear cross braces 40 are caused interlocking therewith to approach each other. Therefore, a fixed end of the release lever 41 on a side of the cross brace 40, the release lever being arranged between the cross brace 40 and the main rear column 1A, is lifted upward about an axis of turning on a fixed end of the release lever on a side of the main rear column 1A. Then, the length of release wire 42 is simultaneously pulled upward, and a force, which the length of release wire 42 applies on the brake lever 12 from below, exceeds the brake actuating forces in association with points of action on the brake lever 12 and directions of forces, so that braking is released to enable conveying an empty wheelchair.

Finally, an explanation will be given to a constitution of the first embodiment of the automatic opening mechanism for legs, which hold steps, with reference to FIGS. 1, 3, and 6. Struts 51 fixed to upper portions of legs 50 are pivotally fitted and inserted into upper ends of the first main front columns 1C. Torsion springs 52 mounted on the first main front columns 1C bias the struts 51 to open the same outside as viewed from a front of the wheelchair. The struts 51 may be reversely biased so that the left and right legs 50 are closed inside to be folded to overlap each other. Formed on lower ends of the legs 50 are supports 50A to extend substantially horizontally and forward. Provided on intermediate portions of the legs 50 are horizontal struts 50B to extend toward the first main front columns 1C. Ends of the horizontal struts 50B are pivotally mounted on the first main front columns 1C. Strut supports 60 are fixed below the horizontal struts 50B.

Figure 6:
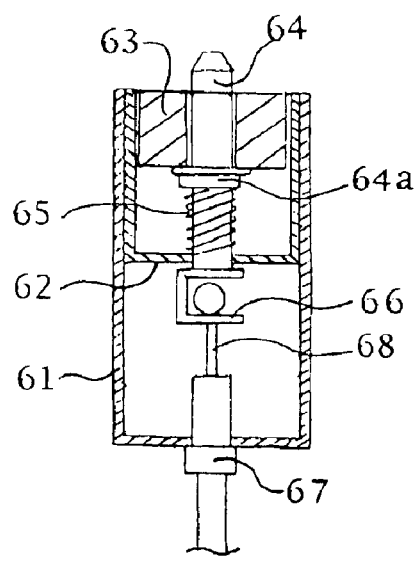
FIGS. 6A and 6B show a control device of an automatic step opening mechanism housed in a horizontal strut of a step holding leg, or in a lower portion of the step holding leg, FIG. 6A being a cross sectional view showing a state, in which a stopper projects, and FIG. 6B being a cross sectional view showing a state, in which the stopper withdraws.
Figure 6:
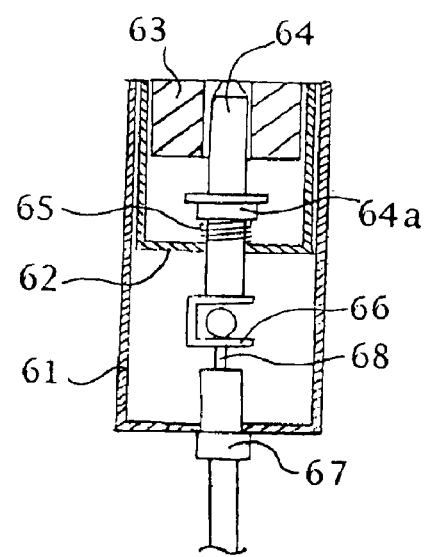

The strut supports 60 house therein structures as shown in FIG. 6. The strut supports 60 comprise top-opened casings 61, in which top-opened spring supports 62 are fixed. Bushes 63 are fixed in upper areas of the spring supports 62. Stoppers 64 arranged through the spring supports 62 are slidably inserted into the bushes 63. Springs 65 are arranged between the spring supports 62 and flanges 64a of the stoppers 64 to bias the stoppers 64 so that tip ends of the stoppers 64 project from the bushes 63. Fixed to inner ends of the stoppers 64 are wire fixing members 66. Fixed to the wire fixing members 66 are lower ends of lengths of wire 68 for opening of steps. The lengths of wire 68 are surrounded by wire guides 67. Upper ends of the lengths of wire 68 are fixed through the damper support plates 21 to the actuation plates 16.

Recesses 50a are provided in those positions on undersides of the horizontal struts 50B, which correspond to the stoppers 64.

Subsequently, an explanation will be given to an action of the automatic opening mechanism for legs. As described with respect to an action of the automatic brake mechanism, the brake levers 12 swing downward to release braking in a state, in which a user sits on the seat 5 of the wheelchair as shown in FIGS. 1 and 2. At the same time when the lengths of wire 22 for actuation of braking, connected to the brake levers 12 loosen, the lengths of wire 68 for opening of steps also loosen, so that the springs 65 in the casings 61 for the stopper bias and project the stoppers 64, as shown in FIG. 6A, to engage the same with the recesses 50a in the horizontal struts 50B so that the legs 50 are not opened by the bias of the torsion springs 52 when the legs 50 are set in positions for use.

In contrast, when a user rises from a state of sitting on the seat 5 as shown in FIGS. 1 and 2, extension forces of the dampers 20 pull the lengths of wire 22 upward and the brake levers 12 coupled to the lengths of wire 22 are pulled up to apply braking, as described with respect to the action of the brake mechanism. Since the lengths of wire 68 coupled at upper ends thereof to the actuation plates 16 are also pulled in the same as the lengths of wire 22, the stoppers 64 of the strut supports 60 withdraw, as shown in FIG. 6B, to be released from engagement with the recesses 50a in the horizontal struts 50B.

Thereby, control on the bias of the torsion springs 52 is released, so that the bias of the torsion springs 52 opens steps 53 left and right together with the pair of left and right legs 50 and so no obstacle is constituted when a user of the wheelchair begins walking. Setting of the legs 50 to positions for use is effected such that when the legs 50 are manually turned to positions for use after a user goes away from the wheelchair, the stoppers 64 are projected to engage with the recesses 50a to thereby fix the legs in a forwardly directed, neutral state, which corresponds to positions for use when a user rides on the wheelchair.

Conventionally, the steps 53 must be removed to positions constituting no hindrance to walking with hands or feet before a user rises and begins walking. In the first embodiment, accidents are prevented, in which a paralytic user or a user who cannot bend forward to reach hands to the steps 53 stumbles and falls, since the steps 53 are moved to positions constituting no hindrance to beginning of walking before a user rises and begins walking.

Second Embodiment

Figure 7:
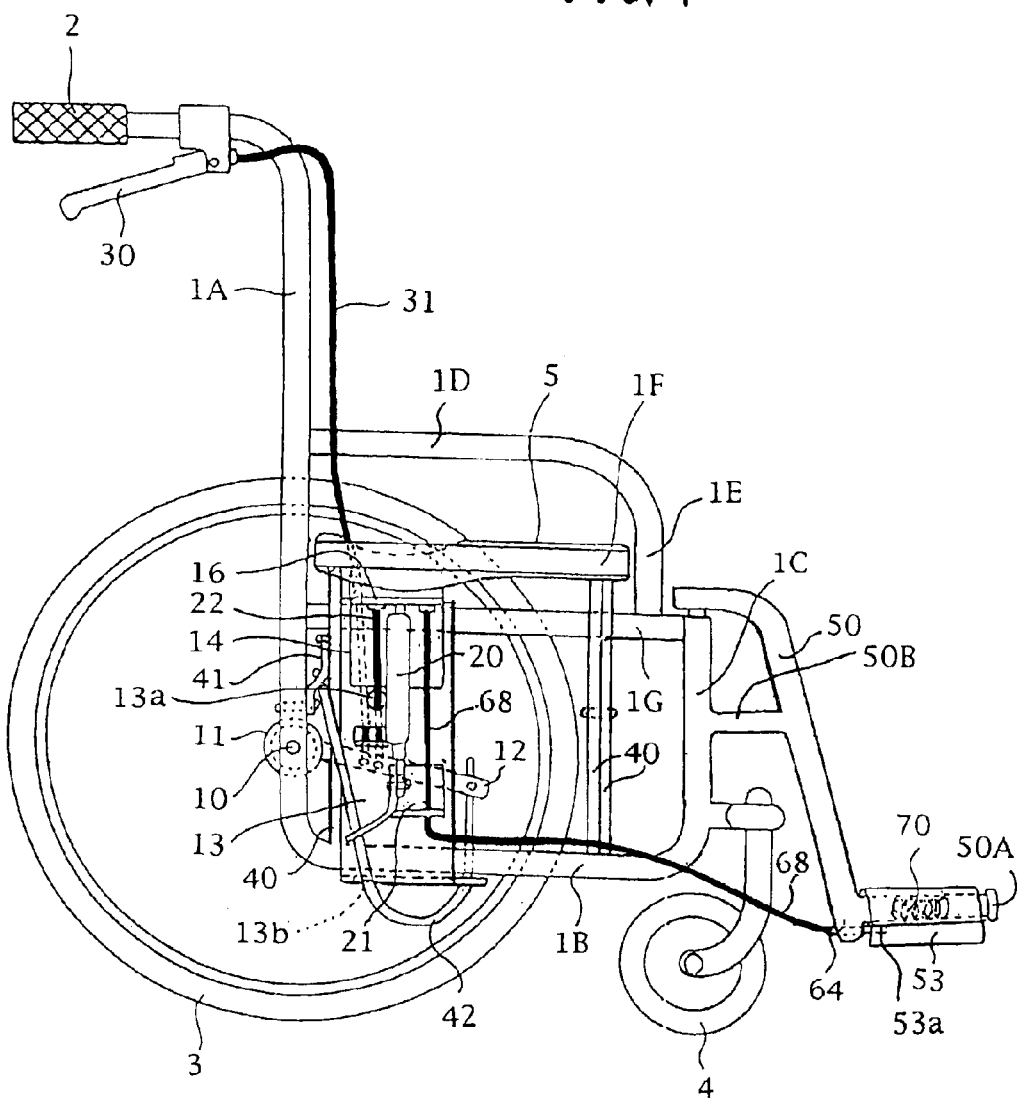
FIG. 7 is a side view showing a further embodiment of a wheelchair with an automatic brake according to the invention when a left side of a wheelchair body in a state, in which a user sits on a seat, is viewed from inside.
Figure 8:
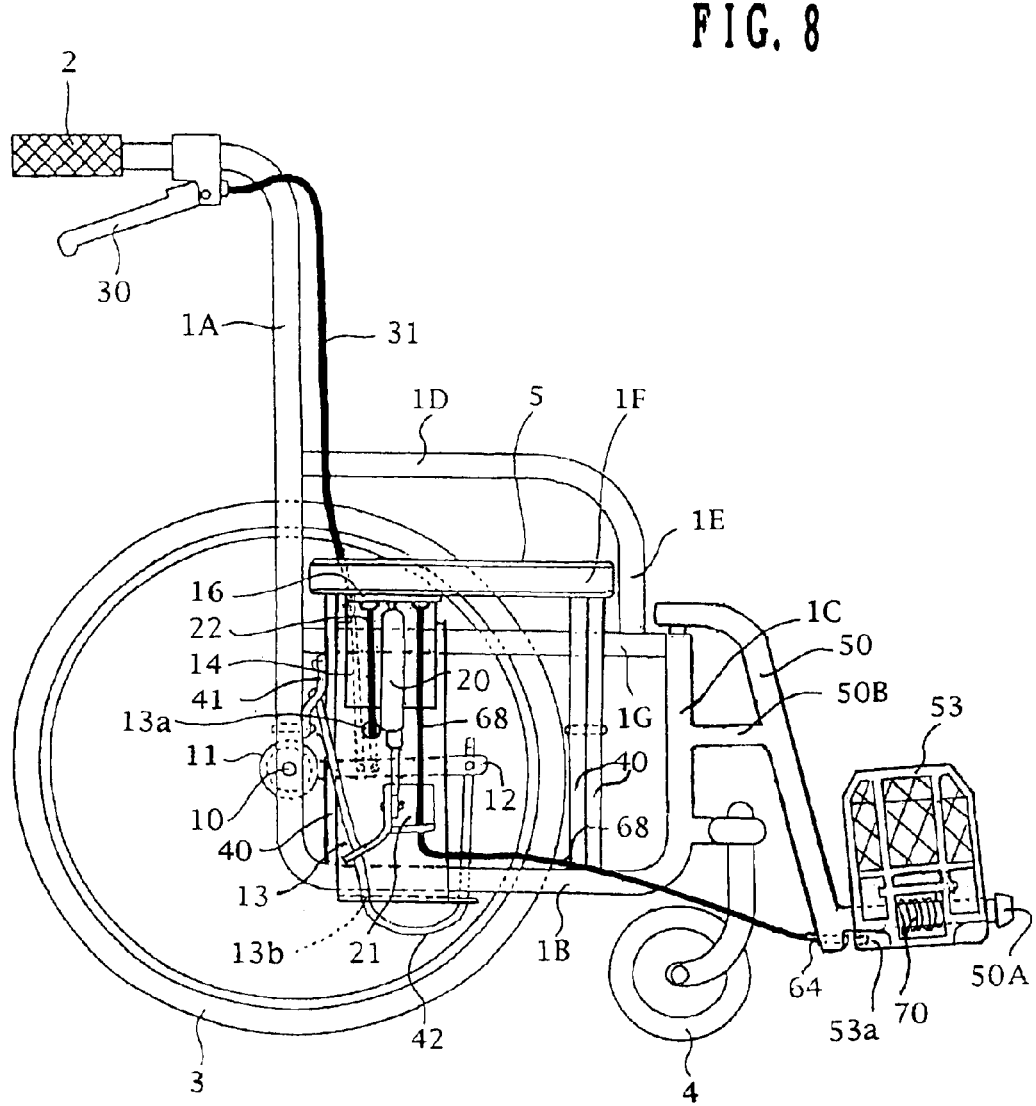
FIG. 8 is a side view showing a still further embodiment of a wheelchair with an automatic brake according to the invention when a left side of a wheelchair body in a state, in which a user goes away from a seat, is viewed from inside.

FIGS. 7 and 8 show a second embodiment of the automatic opening mechanism for steps. In addition, in the second embodiment, members being the same as, or corresponding to those in FIGS. 1 to 6 are denoted by the same reference numerals, and an explanation therefor is omitted. In the present embodiment, legs 50 are fixed to first main front columns 1C. Tip ends of lower portions of the legs 50 constitute supports 50A, and steps 53 are rotatably born by the supports 50A. The steps 53 turn to assume two positions including a horizontal position and a vertical position. Springs 70 are mounted on the supports 50A to bias the steps 53 to vertical position at all times. Also, formed in base positions of the supports 50A are stoppers 64 having the same function as that of the stoppers 64 in the control device for the leg opening mechanism in the first embodiment. Provided on the steps 53 are recesses 53a, with which the stoppers 64 engage. Like the first embodiment, lengths of wire 68 for opening of steps are fixed at lower ends thereof to wire fixing members 66 in the casings 61 for the stoppers and at upper ends thereof through support plates 21 to actuation plates 16.

Accordingly, with the embodiment, the stoppers 64 at lower portions of the step holding legs project to engage with the recesses 53a in the same manner as the case in FIG.

1, in a state, in which a user sits on a seat 5 of the wheelchair as shown in FIG. 7. Therefore, the steps 53 are held in positions (horizontal) for use notwithstanding the bias of springs 70. Also, when a user rises from a state shown in FIG. 7, the stoppers 64 withdraw and separate from the recesses 53a on the steps 53, and so the steps 53 are put in a vertical position from a horizontal position as shown in FIG. 8 by the bias of the springs 70 not to constitute an obstacle when a user of the wheelchair begins walking. Such arrangement produces the same effect as that in the first embodiment.

Third Embodiment

Figure 9:
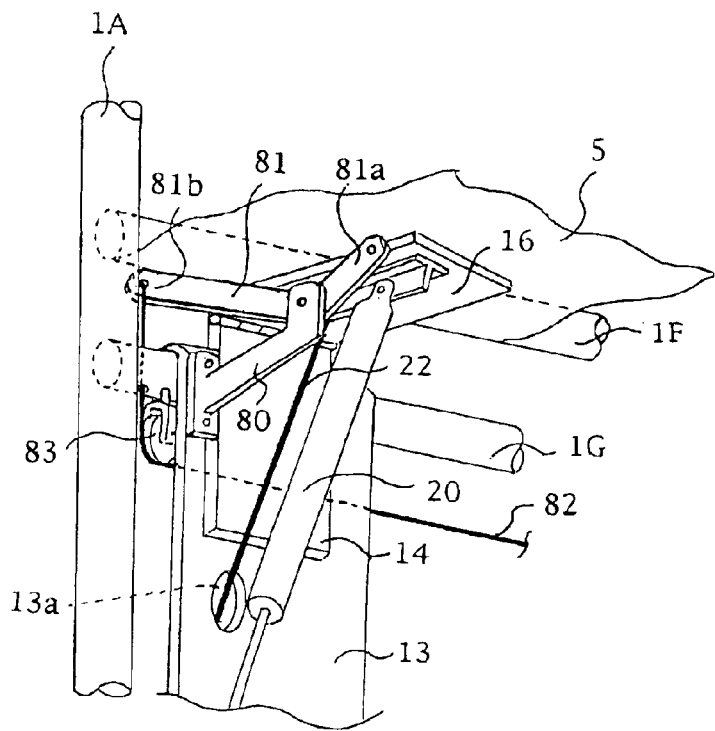
FIGS. 9A and 9B show a still further embodiment of a wheelchair with an automatic brake according to the invention, FIG. 9A being a perspective view showing a left side of an essential part of a wheelchair body in a state, in which a user sits on a seat, as viewed from obliquely rearward and inside, and FIG. 9B being a schematic side view showing only related portions for the purpose of explaining the function of the embodiment.
Figure 9:
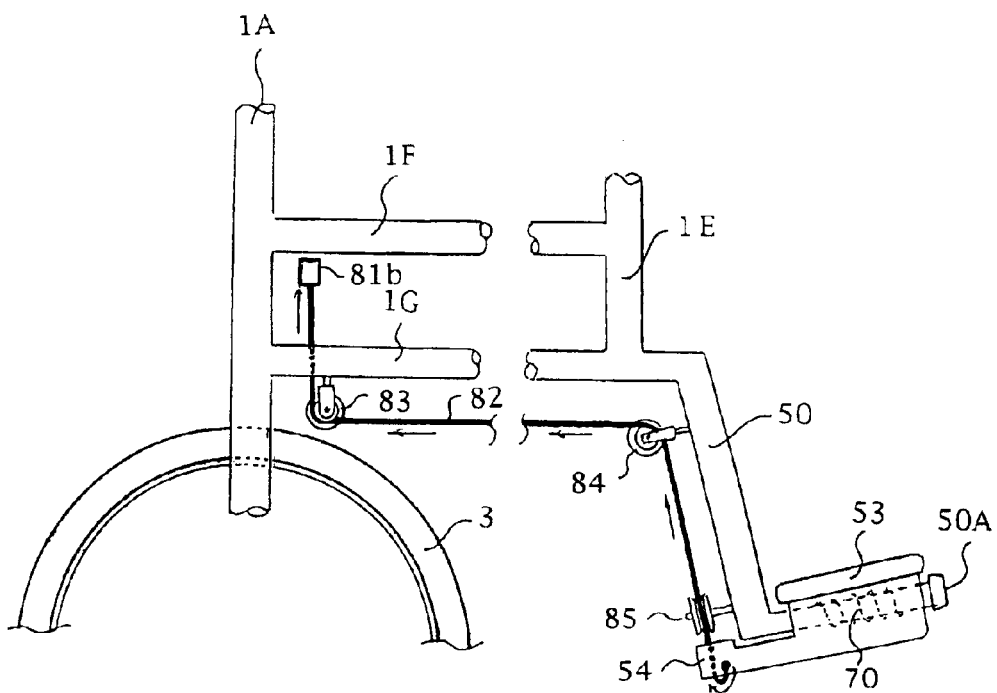
Figure 10:
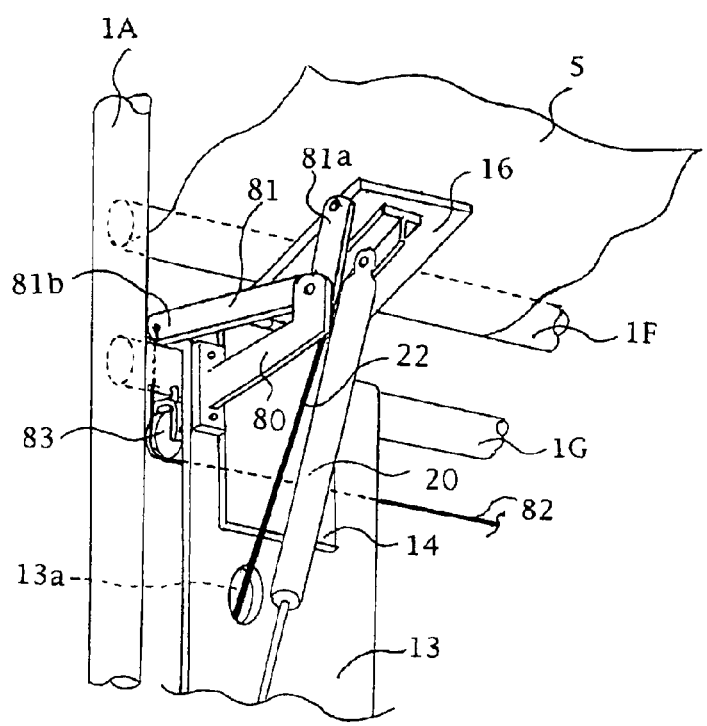
FIGS. 10A and 10B show a state, in which a user goes away from a seat, FIG. 10A being a perspective view similar to FIG. 9A, and FIG. 10B being a schematic side view similar to FIG. 9B.
Figure 10:
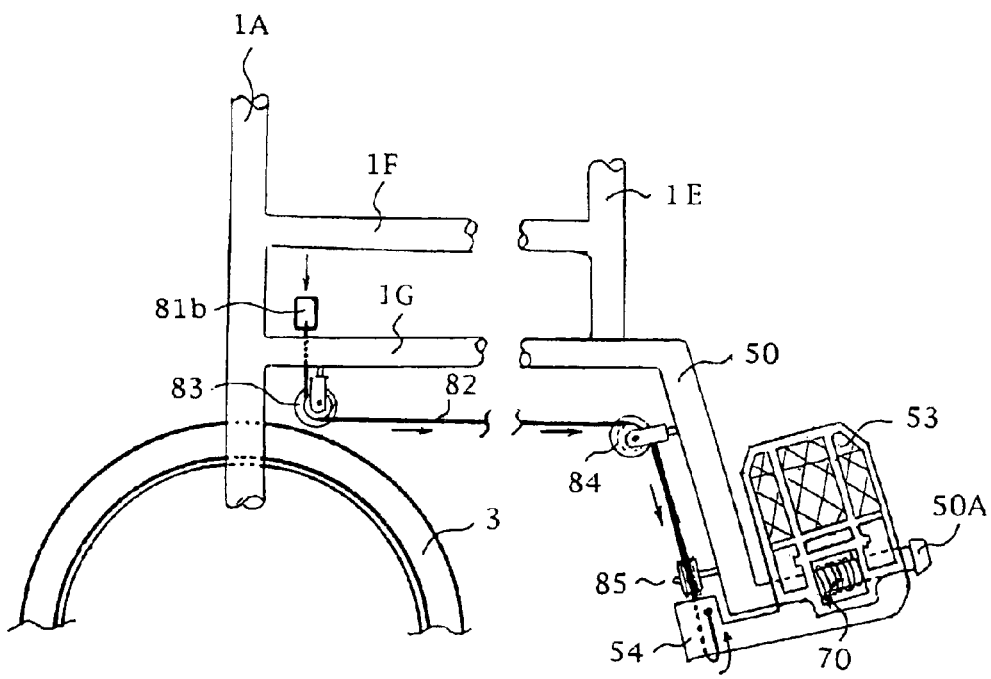

FIGS. 9 and 10 show a third embodiment of the automatic opening mechanism for steps.

Fixed to a first mount plate 13 is a crank support arm 80 extending toward an actuation plate 16, and swingably born by the crank support arm 80 is a bent portion of a L-shaped crank 81 having a short arm 81a and a long arm 81b. An end of the short arm 81a of the crank 81 is pivotally coupled to the actuation plate 16, and an upper end of a length of wire 82 for opening of a step is fixed to an end of the long arm 81b of the crank 81. The length of wire 82 for opening of a step extends through a second mount pipe 1G and passes guide rollers 83, 84, 85, which are rotatably provided on the second mount pipe 1G and a leg 50, and a lower end of the length of wire is fixed to a step actuation arm 54, which is united with the step 53, from below.

Subsequently, an explanation will be given to an action. When a user sits on a wheelchair, the user's body weight lowers a seat 5 as shown in FIG. 9, and the actuation plate 16 is correspondingly pushed down. Thereby, the crank 81 is caused to swing about a support shaft of the crank support arm 80 in a clockwise direction as viewed in FIG. 9A, so that the end of the short arm 81a lowers and the end of the long arm 81b rises. When the end of the long arm 81b rises, the length of wire 82 for opening of a step, an upper end of which is coupled to the end of the long arm, is pulled up to go round the step actuation arm 54 from beneath, thus acting as a force to pull down the step actuation arm. Thereby, the step 53 having been put in a vertical position is turned inside 90 degrees to come to a horizontal position to be set in a position for use.

Meanwhile, when a user of the wheelchair rises, the seat 5 ascends and the actuation plate 16 is pushed upward by the force of a damper 20 as shown in FIG. 10, the crank 81 is caused to swing about the support shaft of the crank support arm 80 in a counterclockwise direction, so that the end of the short arm 81a rises and the end of the long arm 81b lowers. Thereby, since the length of wire 82 for opening of a step loosens to release a pulling force acting on the step actuation arm 54, the restoring force of the springs 70 housed in the step 53 shifts the step 53 from the horizontal position to the vertical position, so that the step is positioned not to prevent a user of the wheelchair from rising and then beginning walking.

In this manner, according to the third embodiment, when a user sits on a wheelchair, the step 53 automatically comes to a horizontal position to be set in a position for use, and when a user rises, the step automatically comes to a vertical position to be set in a position not to obstruct walking, so that a more excellent effect than that in the first embodiment is produced.

An explanation will be given below to other modifications.

In the above embodiments, the brake levers 12 are connected directly to the brake means 11 but may be connected to the brake means through a length of wire.

The first bias means adopts the dampers 20 but may adopt other means.

The second bias means adopts the coil springs 52 and the third bias means adopts the coil springs 70 but may adopt other bias means than coil springs.

The actuation plates 16 are not necessarily disposed on the back side of the seat 5.

The present examples and embodiments are to be considered as illustrative and not restrictive, and the invention is not to be limited to the details given herein, but may be modified within the scope and equivalence of the appended claims.

What is claimed is:

1. A wheelchair comprising:

a seat, a pair of rear wheels fixed to axle shafts arranged below the seat and arranged outside both sides of the seat, a grasping portion arranged rearwardly of the seat to be grasped and operated by a helper, at least one front wheel arranged forwardly of the axle shafts, actuation plates arranged on a back surface of the seat and in juxtaposition with the seat to descend when a user sits on the seat to lower the seat with a weight of the user and to ascend when the user rises from the seat to permit the seat to return with removal of the weight, a first bias means provided on the actuation plates wherein the actuation plates are constantly biased upward by the first bias means;

brake means mounted on the axle shafts to brake the axle shafts and energized constantly in a non-braking direction, and levers coupled directly or indirectly to the brake means to move according to descending motions of the actuation plates to act on the brake means to put the brake means in a non-braking state and to move according to ascending motions of the actuation plates to act on the brake means to put the brake means in a braking state, the levers also being connected to the actuation plates through lengths of wire wherein the levers are pulled upwards by the lengths of wire with upward movements of the actuation plates and the levers move downwards with downward movements of the actuation plates, wherein when the user sits on the seat, the user's weight causes the seat to descend and the actuation plates to move downward and positional movements of the actuation plates cause the levers to move to release braking on the axle shafts by the brake means, and when the user having sat on the seat rises, the actuation plates having been pushed down by the user's weight move upward and positional movements of the actuation plates cause the levers to move to permit the brake means to brake the axle shafts.

2. The wheelchair according to claim 1, wherein the levers extend forward relative to positions of the axle shafts of the rear wheels.

3. The wheelchair according to claim 2, wherein the actuation plates are provided to contact with an underside of a rear portion amounting to about ¼ of the seat.

4. A wheelchair comprising:

a seat, a pair of rear wheels fixed to axle shafts arranged below the seat and arranged outside both sides of the seat, a grasping portion arranged rearwardly of the seat to be grasped and operated by a helper, at least one front wheel arranged forwardly of the axle shafts, legs extended forward and downward from the seat, steps mounted on the legs, actuation plates provided in juxtaposition with the seat to descend when a user sits on the seat to lower the seat with a weight of the user and to ascend when the user rises from the seat to permit the seat to return with removal of the weight, brake means mounted on the axle shafts to brake the axle shafts and energized constantly in a non-braking direction, levers coupled directly or indirectly to the brake means to move according to descending motions of the actuation plates to act on the brake means to put the brake means in a non-braking state and to move according to ascending motions of the actuation plates to act on the brake means to put the brake means in a braking state, the legs being turnably supported horizontally in base positions and biased in one directions of turning by second bias means, and position holding means for holding the legs in positions, in which the steps are used, against the bias of the second bias means and released from a holding state as the actuation plates move upward, wherein when the user sits on the seat, the user's weight causes the seat to descend and the actuation plates to move downward and positional movements of the actuation plates cause the levers to move to release braking on the axle shafts by the brake means, and when the user having sat on the seat rises, the actuation plates having been pushed down by the user's weight move upward and positional movements of the actuation plates cause the levers to move to permit the brake means to brake the axle shafts and the holding state by the position holding means is released to cause the bias of the second bias means to evacuate the legs.

5. The wheelchair according to claim 4, wherein the actuation plates are arranged on a back surface of the seat.

6. The wheelchair according to claim 5, further comprising first bias means provided on the actuation plates and wherein the actuation plates are constantly biased upward by the first bias means.

7. The wheelchair according to claim 6, wherein the levers are connected to the actuation plates through lengths of wire and the levers are pulled by the lengths of wire with upward movements of the actuation plates to swing upward and swing downward with downward movements of the actuation plates.

8. The wheelchair according to claim 7, wherein the levers extend forward relative to positions of the axle shafts of the rear wheels.

9. The wheelchair according to claim 8, wherein drive is transmitted through lengths of wire to the position holding means from the actuation plates.

10. The wheelchair according to claim 9, wherein the legs are arranged left and right on both sides and open outward or inward.

11. The wheelchair according to claim 10, wherein the actuation plates are provided to contact with an underside of a rear portion amounting to about ¼ of the seat.

12. A wheelchair comprising:

a seat, a pair of rear wheels fixed to axle shafts arranged below the seat and arranged outside both sides of the seat, a grasping portion arranged rearwardly of the seat to be grasped and operated by a helper, at least one front wheel arranged forwardly of the axle shafts, legs extended forward and downward from the seat, steps mounted on the legs, actuation plates provided in juxtaposition with the seat to descend when a user sits on the seat to lower the seat with a weight of the user and to ascend when the user rises from the seat to permit the seat to return with removal of the weight, brake means mounted on the axle shafts to brake the axle shafts and energized constantly in a non-braking direction, levers coupled directly or indirectly to the brake means to move according to descending motions of the actuation plates to act on the brake means to put the brake means in a non-braking state and to move according to ascending motions of the actuation plates to act on the brake means to put the brake means in a braking state, the steps being turnably supported in base positions and biased in one directions of turning by third bias means, and position holding means for holding the steps in positions, in which the steps are used, against the bias of the third bias means and released from a holding state as the actuation plates move upward, wherein when the user sits on the seat, the user's weight causes the seat to descend and the actuation plates to move downward against the first bias means and positional movements of the actuation plates cause the levers to move to release braking on the axle shafts by the brake means, and when the user having sat on the seat rises, the actuation plates having been pushed down by the user's weight move upward by the first bias means and positional movements of the actuation plates cause the levers to move to permit the brake means to brake the axle shafts and the holding state by the position holding means is released to cause the bias of the third bias means to evacuate the steps.

13. The wheelchair according to claim 12, wherein the actuation plates are arranged on a back surface of the seat.

14. The wheelchair according to claim 13, further comprising first bias means provided on the actuation plates and wherein the actuation plates are constantly biased upward by the first bias means.

15. The wheelchair according to claim 14, wherein the levers are connected to the actuation plates through lengths of wire and the levers are pulled by the lengths of wire with upward movements of the actuation plates to swing upward and swing downward with downward movements of the actuation plates.

16. The wheelchair according to claim 15, wherein drive is transmitted through lengths of wire to the position holding means from the actuation plates.

17. The wheelchair according to claim 16, wherein the actuation plates are provided to contact with an underside of a rear portion amounting to about ¼ of the seat.

18. The wheelchair according to claim 17, wherein when the holding state by the position holding means is released, the steps turn from a horizontal state to evacuate to a standing state.

* * * * *